Figure 1:
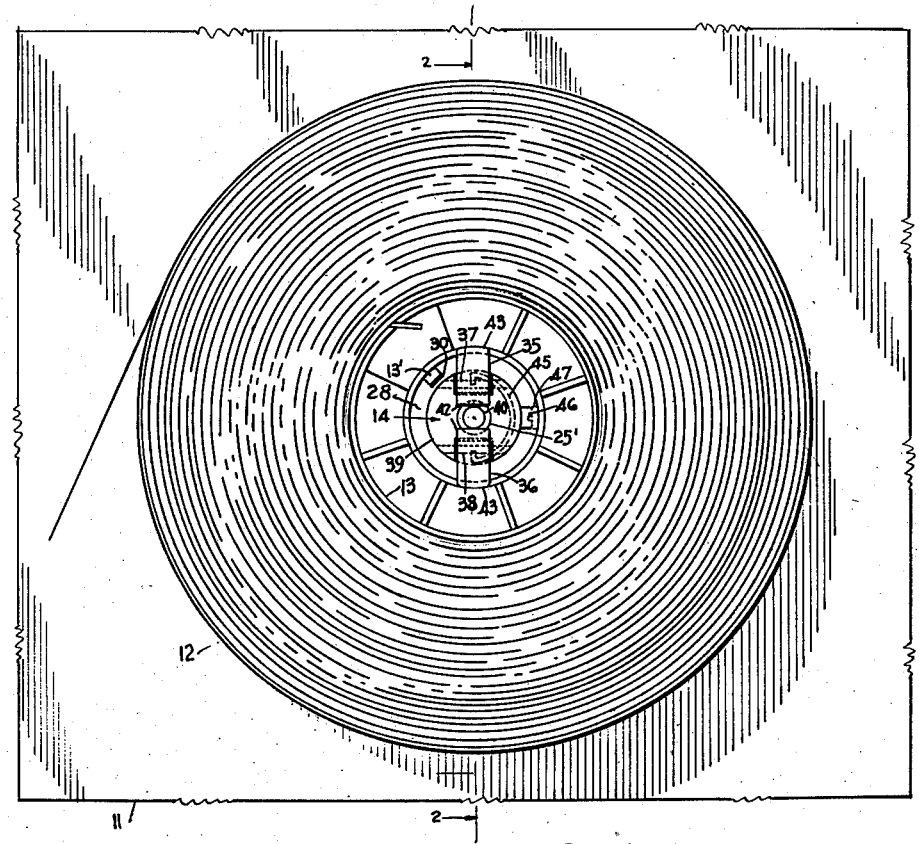

May 10, 1938.  R. C. STEVENS  2,116,735

SPOOL SPINDLE FOR FILM MAGAZINES

Filed Dec. 4, 1935

Inventor.
Robert Colby Stevens.

By Robt. L. Gunn
Attorney.

Patented May 10, 1938

2,116,735

UNITED STATES PATENT OFFICE 2,116,735

SPOOL SPINDLE FOR FILM MAGAZINES

Robert Colby Stevens, Long Beach, Calif., assignor to Twentieth Century-Fox Film Corporation, Los Angeles, Calif., a corporation of New York Application December 4, 1935, Serial No. 52,791

4 Claims. (Cl. 242—70)

This invention relates to film handling means and deals particularly with a spool spindle such as is used in film magazines on motion picture cameras.

The principal object of this invention is to provide a spool spindle in a film magazine having means incorporated in the spindle for securing or locking thereon the film spool upon which the film is ordinarily wound. The present invention has been developed in conjunction with the production of a silent motion picture camera, and is intended to be used primarily as a means for assisting in lowering the camera noise level. By locking the spool upon the spindle, it is obvious that all noise caused by the looseness of the spool upon the spindle is eliminated and the invention becomes a means toward this end.

Another object of this invention is to provide means for preventing shifting of the spool upon the spindle and thus insure a true alignment of the spool with the film for winding. As a result, the spool will wind the film in a straight roll and will prevent the film from scraping the sides of the magazine as the roll of film increases. Thus, again, the camera noise may be reduced.

A further object of this invention is to provide a spool spindle having a flange thereon, with means for locking a film spool against the flange.

It is another object of this invention to provide a spool spindle of the character described, wherein manually accessible means exteriorly of the magazine is provided for locking the spool upon the spindle.

Figure 2:
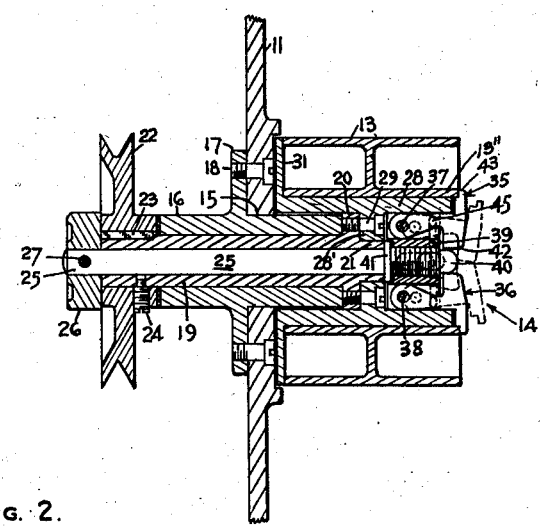
Figure 3:
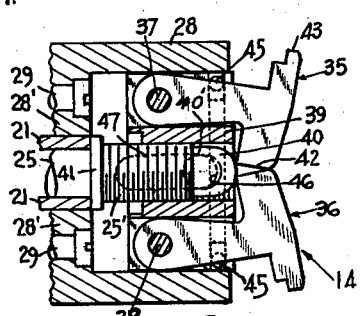

Other objects and advantages will become apparent as the description proceeds in conjunction with the drawing in which:

Figure 1 is an elevation of a roll of film mounted upon a film spool showing the manner in which the spool is mounted upon the spindle, Figure 2 is a sectional view of the film spool and the spindle taken on line 2—2 of Figure 1, and Figure 3 is an enlarged fragmentary sectional view of the spool locking device.

Briefly stated, the invention comprises a pair of pivoted fingers mounted on the end of a spindle with external means for manipulating the fingers so that a spool may be slid over the end of the spindle in the ordinary manner. The fingers may then be brought into a clamping position and are arranged to extend over and engage the outer face of the spool. The spool is clamped down into a tight fitting engagement against a flange which serves to hold the spool in a true axial position and provides means for forming a straight roll of film on the spool. The structure is simple and efficient and may be used on either or both the take-up side and the delivery side of a film magazine.

In the drawing I have illustrated my invention in conjunction with a roll of film within a magazine case which is fragmentarily shown. Referring to Figure 1, there will be observed a fragmentarily illustrated magazine case designated 11 and a roll of film 12 wound upon a film spool 13. The film spool in turn is mounted upon a spindle and held thereon by a locking arrangement generally designated 14. In Figure 2 I have illustrated the structure and arrangement of the spindle parts in detail. In this view it will be seen that the magazine case 11 is provided with an opening 15 into which a bearing member 16 having a flange 17 is mounted and held therein by means of screws 18. The bearing member 16 is bored to take a sleeve 19 which carries a flange 20 at the inner end thereof and a reduced portion 21 extending beyond the flange. The sleeve 19 is properly termed an element of the spindle. On the other end of the sleeve I mount a V pulley 22 and secure the pulley to the sleeve by means of a key 23. A set screw 24 is provided for holding the pulley 22 from endwise travel on the sleeve 19. Inside the sleeve 19 I rotatably mount a rod 25 and to the outer end of the rod I secure a knob 26 by means of a pin 27 extending through the knob and the rod. On the inner end of the rod 25 I mount the aforementioned locking device generally designated 14. On the inner end of the sleeve 19 and bearing against the flange 20, I mount a sleeve 28 by means of screws 29 extending through a flange 28' formed integral with the sleeve 28. The sleeve 28 extends over the inner end of the bearing member 16 and carries a flange 31 which is adapted to rotate close to the inner wall of the magazine 11. It will be observed that the sleeve 28 is adapted to receive the spool 13 and forms therewith a detachable engagement. A keyway 30 may be provided in the sleeve 28 to receive the conventional tongue 13' on the spool 13. For purposes of describing and claiming, the sleeve 28 will be termed the spindle, since it is the rotatable element upon which the film spool is mounted. The means for holding the spool 13 on the sleeve 28 and against the flange 31 comprises the locking device 14. Referring to Figure 3, it will be seen that the locking device comprises fingers 35 and 36 pivotally mounted at 37 and 38 upon a traveling member 39 which in turn is screw threadedly mounted upon a screw threaded portion 25' on the end of the rod 25. Instead of a screw threaded mounting for the member 39, I may use a cam arrangement. Beyond the screw threaded portion 25' of the rod 25, I form a rounded tip 40. It will be noted that the rod 25 is formed with a flange 41 arranged to bear against the inner end of the reduced portion 21 of the sleeve 19 for holding the rod 25 against longitudinal displacement. With respect to the fingers 35 and 36, it may be stated that these fingers are identical and the description of one will serve for both. In the drawing I have illustrated but two fingers, however, it is obvious that three or more fingers could be used. Referring to finger 35, it will be seen that this finger has an inwardly extending portion 42 which is adapted to extend over the end of the member 39 and engage the rounded tip 40. On the opposite side of the finger, I form an extension 43 which is arranged to extend over the end of the sleeve 28 and engage the end of the inner wall 13" of the spool 13. In Figure 2 I have shown two positions of the fingers, one in solid lines, which is the position for clamping the spool on the spindle, and the other in dotted lines, which is the position for mounting or dismounting the spool from the spindle. The dotted line position is obtained by turning the rod 25 by means of the knob 26 and causing the member 39 to travel outwardly on its screw threaded engagement with the rod 25 until the inner ends 42 of the fingers 35 and 36 ride over the top of the rounded tip 41 and are drawn inwardly by a spring 45. The traveling member 39 is held against rotation by means of a screw 46 mounted in the member 39 working in a slot 47 in the sleeve 28. In this position, the fingers are drawn inwardly by the spring 45 until the outer ends 43 of the fingers are inside the inner diameter of the spool opening. The spool may then be slipped over the spindle in the ordinary manner. After the spool is mounted on the spindle, the knob 26 is again turned to pull the member 39 inwardly thus forcing the inner extensions 42 of the fingers to slide over the rounded tip 40. The fingers are accordingly swung on their pivots 37 and the outer ends 42 are forced apart and extend over the outer face of the spool. It will be noted that just beyond the threaded portion 25' of the rod 25 there is a cylindrical portion 40' of the rod that precedes the rounded tip 40. The purpose of this straight portion is to provide an inward travel of the fingers with no expansion. The pivoting movement previously described merely forces the fingers over the outer face of the spool. As the fingers are drawn inwardly over the straight portion of the rod, they engage the outer face of the spool and move the same against the flange. In this manner the spool is clamped against rotation and at the same time is aligned by pressing against the flange 31. As before stated, it is one of the objects of this invention to provide means whereby the spool is locked upon the spindle and is held in true alignment on the spindle, and the flange and finger arrangement above described are for this purpose.

I claim:

1. A film spool spindle for film magazines comprising: a bearing member adapted to be mounted in a film magazine; a rotatable spindle supported by said bearing member adapted to receive a film spool; a rod rotatably mounted within said spindle; means for holding said rod against longitudinal movement; a member movably mounted within said spindle and screw threadedly engaged with said rod; means for holding said member against rotation with respect to said spindle; fingers pivotally mounted on said member, and means for causing said fingers to move into a spool clamping position upon longitudinal movement of said member, said last mentioned means including a rounded tip on said rod and extensions on said fingers adapted to slidably engage said tip.

2. A film spool spindle for film magazines comprising: a bearing member adapted to be mounted in a film magazine; a rotatable spindle supported by said bearing member adapted to receive a film spool; a rod rotatably mounted within said spindle; means for holding said rod against longitudinal movement; a member movably mounted within said spindle and screw threadedly engaged with said rod; means for holding said member against rotation with respect to said spindle; fingers pivotally mounted on said member, and means for causing said fingers to move into a spool clamping position upon longitudinal movement of said member, said last mentioned means including a rounded tip on said rod, extensions on said fingers adapted to slidably engage said tip, and a spring arranged to hold said extensions in pressure engagement with said tip.

3. For use with a film magazine: a film spool spindle adapted to be rotatably mounted in said magazine; a rod rotatably mounted within said spindle; means for holding said rod against longitudinal movement; a member movably mounted within said spindle and screw threadedly engaged with said rod; means for holding said member against rotation with respect to said spindle; fingers pivotally mounted on said member; and means for causing said fingers to move into a spool clamping position upon longitudinal movement of said member, said last mentioned means including a rounded tip on said rod and extensions on said fingers adapted to slidably engage said tip.

4. For use with a film magazine; a film spool spindle adapted to be rotatably mounted in said magazine; a rod rotatably mounted within said spindle; a member movably mounted within said spindle and screw threadedly engaged with said rod; fingers pivotally mounted on said member, and means for causing said fingers to move into a spool clamping position upon longitudinal movement of said member, said last mentioned means including a rounded tip on said rod and extensions on said fingers adapted to slidably engage said tip.

ROBERT COLBY STEVENS.